(12) United States Patent
Kohli et al.

(10) Patent No.: US 10,116,375 B2
(45) Date of Patent: Oct. 30, 2018

(54) LINK ACQUISITION IN WIRELESS COMMUNICATION SYSTEMS

(71) Applicant: Facebook, Inc., Menlo Park, CA (US)

(72) Inventors: Sanjai Kohli, Manhattan Beach, CA (US); Djordje Tujkovic, Mountain View, CA (US); Krishna Gomadam, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/604,943

(22) Filed: May 25, 2017

(65) Prior Publication Data
US 2017/0264352 A1    Sep. 14, 2017

Related U.S. Application Data

(62) Division of application No. 14/986,471, filed on Dec. 31, 2015, now Pat. No. 9,698,885.

(51) Int. Cl.
*H04B 7/08*   (2006.01)
*H04B 7/06*   (2006.01)

(52) U.S. Cl.
CPC ........... *H04B 7/088* (2013.01); *H04B 7/0695* (2013.01); *H04B 7/063* (2013.01)

(58) Field of Classification Search
CPC .................................................. H04B 7/0617
USPC ....................................................... 375/260
See application file for complete search history.

(56) References Cited

U.S. PATENT DOCUMENTS

| | | | | |
|---|---|---|---|---|
| 2002/0181509 A1* | 12/2002 | Mody | ................... | H04L 1/0618 370/480 |
| 2006/0173312 A1* | 8/2006 | Jackson | ................... | A61B 8/00 600/437 |
| 2009/0232240 A1* | 9/2009 | Lakkis | ................. | H04B 7/0491 375/260 |
| 2010/0118716 A1 | 5/2010 | Ismail et al. | | |
| 2012/0008603 A1* | 1/2012 | Chu | ..................... | H04B 7/0617 370/338 |

(Continued)

FOREIGN PATENT DOCUMENTS

WO    WO 2015-076856    5/2015

OTHER PUBLICATIONS

PCT/US2016/065194; PCT International Search Report, dated Mar. 16, 2017.

(Continued)

*Primary Examiner* — Lihong Yu
(74) *Attorney, Agent, or Firm* — Brian R. Short

(57) ABSTRACT

A procedure to establish a link in a directional wireless system where two nodes cannot listen to each other unless optimized beamforming pair is used and timing and framing synchronization is acquired. The procedure determines a set of beamforming pairs that the nodes can use for communication in addition to acquiring the framing and timing synchronization. Training packets are periodically transmitted by a transmitter while a receiver listens in each of a number of receive directions. Training packets are sent N times in N directions while a receiver listens in each of M receive directions until all N×M possible transmit and receive direction pair possibilities are tried. The receiver informs the transmitter which transmit and receive direction pairs were successful in creating communication links between the nodes.

20 Claims, 9 Drawing Sheets

(56) References Cited

U.S. PATENT DOCUMENTS

| | | |
|---|---|---|
| 2013/0070750 A1 | 3/2013 | Kim et al. |
| 2015/0289147 A1 | 10/2015 | Lou et al. |
| 2015/0326359 A1* | 11/2015 | Subramanian ........ H04L 5/0023 370/330 |
| 2015/0365814 A1 | 12/2015 | El Ayach et al. |

OTHER PUBLICATIONS

PCT/US2016/065194; Written Opinion of the International Searching Authority, dated Mar. 16, 2017.

* cited by examiner

LINK ACQUISITION IN WIRELESS COMMUNICATION SYSTEMS

RELATED APPLICATIONS

This patent application is a divisional patent application of U.S. patent application Ser. No. 14/986,471 filed Dec. 31, 2015, which is herein incorporated by reference.

TECHNICAL FIELD

The disclosed technology relates to wireless communication networks and in particular to methods of acquiring link synchronization between nodes in wireless communication networks.

BACKGROUND

Wireless networks are becoming increasingly used for the delivery of internet protocol (IP) data to users as well for other tasks such as transmitting data to display devices (TVs, airport or other monitors etc.), wireless switching of data packets in data centers, handling communication traffic as an alternative to landline or cellular systems (e.g. Voice over IP), for data transmission between vehicles and for other uses.

In high throughput wireless communication systems, nodes need to be synchronized to achieve high data transmission and reception rates. In many networks, however, nodes may join and drop from a network at random times. Therefore, the nodes need to reacquire the system synchronization. In the past, nodes were required to have a priori information about how the system transmits training signals before a node could become synchronized. As will be explained in detail below, the present disclosure relates to improvements in the way nodes can become synchronized to wireless networks even if such information is lacking.

SUMMARY

The disclosed technology relates to systems and methods for acquiring link synchronization and determining possible transmit and receive beamforming directions between nodes in a wireless communication network. In one embodiment, destination nodes and client nodes are configured to transmit and receive radio frequency signals in a number of possible spatial directions. In some embodiments, nodes in the wireless communication network transmit in a predetermined time slot, on a predetermined frequency or with an assigned code to avoid interfering with transmissions from other nodes. When a node attempts to join a network, the node lacks information about which beamforming directions create a communication path with a node that will provide synchronization information. In addition, the node may also lack information about the frame structure and periodicity of the transmissions that provide the synchronization information. To join the network, the nodes are programmed to asynchronously detect a training packet and decode it. In the asynchronous mode, a transmitting node (e.g. an initiator) periodically begins transmitting training packets in a number of different transmit (TX) beamforming directions. A receiving node (e.g. a responder) attempting to join the network begins listening for a training packet in each of a number of different receive (RX) beamforming directions. In some embodiments, upon detection of a training packet, the packet is analyzed by the responder for synchronization information and information about one or more of the training packet frame structure and frame periodicity. Once the nodes are synchronized, the responder is programmed to listen for training packets in a synchronous mode to determine combinations of transmit and receive beamforming directions (TX/RX beamforming direction pairs) that can be used to transmit information between the nodes.

In the synchronous mode, the initiator node transmits a training packet N times in a single direction. A receiving node (e.g., the responder) attempts to receive the training packet in each of its M possible receiving directions. Once a training packet has been detected, the responder transmits a feedback signal back to the initiator confirming that the responder has detected a training packet. The one or more transmit and receive beamforming directions on which a communication link was successfully created are recorded as a micro-route for use in communicating between the nodes in the network.

In some embodiments, reciprocity is exploited in establishing a reverse communication link. The transmit beam used in the forward link is used as the receive beam in the reverse link. Similarly, the receive beam direction used in the forward link is used as the transmit beam direction in the reverse link.

DETAILED DESCRIPTION

Figure 1:
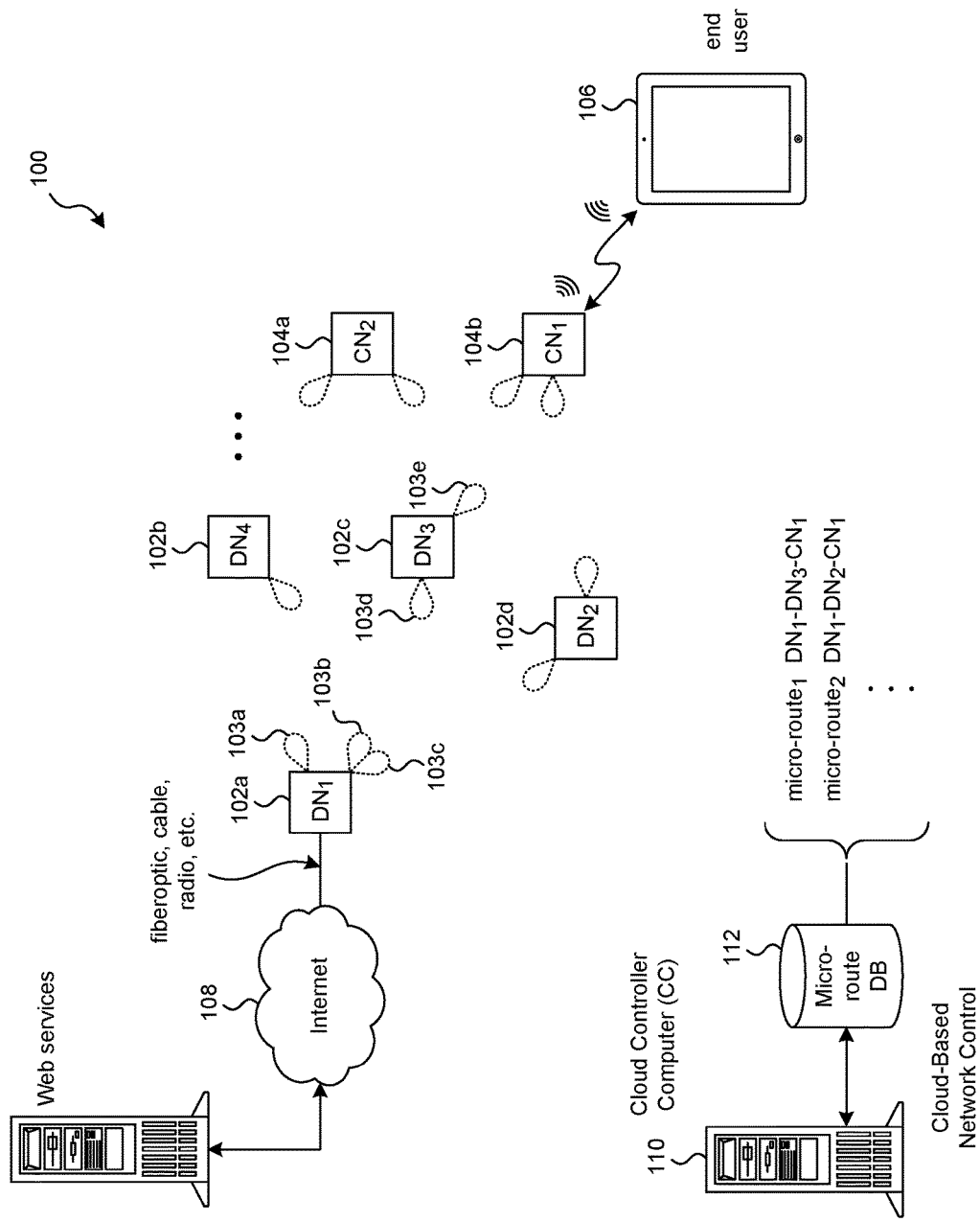
FIG. 1 illustrates a wireless communication network in accordance with some disclosed embodiments.

FIG. 1 shows one embodiment of a point-to-point, point-to-multi-point or multi-point to multi-point wireless communication network. The network 100 includes a number of destination nodes (DN) 102a, 102b, 102c, 102d, etc. and a number of client nodes (CN) 104a, 104b, etc. The destination nodes transmit IP or other data packets between themselves and to the client nodes. The client nodes transmit and receive data such as IP packets between themselves and the destination nodes as well as to a number of end users 106 (wireless-enabled devices such as computers, tablets, smart phones, household appliances, or any other device capable of transmitting and receiving wireless data). The destination nodes 102 are mounted on utility poles or on buildings and can transmit wireless signals approximately 200-300 meters, depending on conditions. The client nodes 104 are generally located in retail/office establishments or in homes in order to transmit and receive wireless data to and from the end users 106. In one embodiment, the wireless data are IP packets that are sent according to a standardized protocol such as IEEE 802.11ad. However, it will be appreciated that any number of other protocols could be used that include both standards-based and non-standards-based protocols.

In the communication network 100, at least one destination node (e.g., node 102a) is coupled to a physical cable that carries data to and from a computer communication link 108 (e.g., the Internet or a private communication link). Data packets that are destined for an end user 106 are received from the communication link and transmitted via one or more routes to the client node 104b, which is in communication with the end user 106. For example, packets may be sent via a first route via nodes $DN_1 \rightarrow DN_3 \rightarrow CN_1$ or via a second route including nodes $DN_1 \rightarrow DN_2 \rightarrow CN_1$, depending on the radio frequency path conditions that may exist at any time.

In order to establish a communication link between each of the nodes as well as to minimize interference between nodes, and to increase the throughput of the network, the destination and client nodes generally include multiple antennas that can be used to direct the transmit and receive directions of the node by beamforming. As will be appreciated by those skilled in the art of radio frequency communications, the nodes include a transceiver and an antenna array that includes multiple antennas that can be used to direct the transmit and receive directions of the node by beamforming. A processor in the node executes instructions that direct a beamformer in the node to selectively weight and delay transmitted signals in order to direct the main lobe (i.e., the bulk of the transmitted signal power) in a desired direction. Similarly, signals received by the antennas can be delayed and summed using beamforming techniques to change the effective listening direction of the receiver. In the embodiment shown in FIG. 1, destination node DN1 102a can beamform its transmitted and received signals in a number of different directions 103a, 103b, 103c. Similarly, destination node $DN_3$ 102c can beamform its transmitted and received signals in directions 103d and 103e. The best communication path between destination nodes $DN_1$ and $DN_3$ is determined by selecting the best transmit and receive beamforming directions for each node in order to complete the communication link. The transmit and receive beamforming direction pairs between two nodes in which a communication link can be completed are referred to herein as "micro-routes."

In one embodiment, transmissions in the wireless network are carried on a nonregulated 60 GHz radio frequency spectrum band. At these frequencies, the ability to transmit and receive wireless data is influenced by changing atmospheric conditions (wind, rain, etc.) or by interfering objects (e.g., buses, tree limbs, or other objects passing in and out of the line of sight). The best communication path between nodes may not always be when the transmit and receive beamforming directions are aligned along the line of sight. Therefore, the best micro-route to complete a communication link between a transmitter and a receiver node in the network may change over time as local propagation conditions vary.

In the embodiment shown, a cloud controller computer 110 includes a database 112 that stores a list of possible routes and micro-routes that have been determined to work between the various nodes of the network. The cloud computer 110 can communicate with each of the nodes by sending packets that are addressed to the nodes in order to control the overall operation of the network. Such communications can include routing tables that inform the nodes how packets should be sent through the network to reach any particular node in the network. For example, destination node $DN_1$ may have an entry in its routing table for client node $CN_2$ that says a packet to that node should be routed through destination node $DN_4$ and not through destination node $DN_3$. In one embodiment, the nodes also store records of the best micro-routes (TX and RX beamforming directions) that can be used to communicate between nodes.

As will be described in detail, the disclosed embodiments are directed to improved methods of acquiring and maintaining synchronization between nodes in a wireless communication network. In a wireless communication system of the type shown in FIG. 1, there is no universal time base that is transmitted to each node. Each node includes an internal clock that is subject to drift over time. If a node loses communication with another node in the system or is newly added to the network, it is likely that the clock that tells the node when to transmit and receive will be out of synch with the clocks of the other nodes in the network.

In addition, because beamforming is generally required to establish any communication link between the nodes, a node joining or re-joining the network will likely not know which RX beamforming directions should be used to receive data from another node. Typically, only a few combinations of TX and RX beamforming directions will work and a node cannot look in every possible angular direction due to RF chip limitations. Finally, the node joining the network may not know anything about the frame size, the periodicity of the data transmissions from the other nodes or the codebook being used by the nodes in the network.

The disclosed embodiments allow a node in a wireless communication network to acquire network synchronization without knowing one or more of the optimal TX/RX beamforming directions, the frame structure or frame periodicity. As will be explained in further detail below, assuming that the transmitting node can beamform in N possible transmit directions and the receiving node can beamform in M possible receive directions, the disclosed technology allows a determination of which of the N×M possible transmit and receive beamforming direction possibilities are useful to communicate between a transmitting node and a receiving node.

Figure 2:
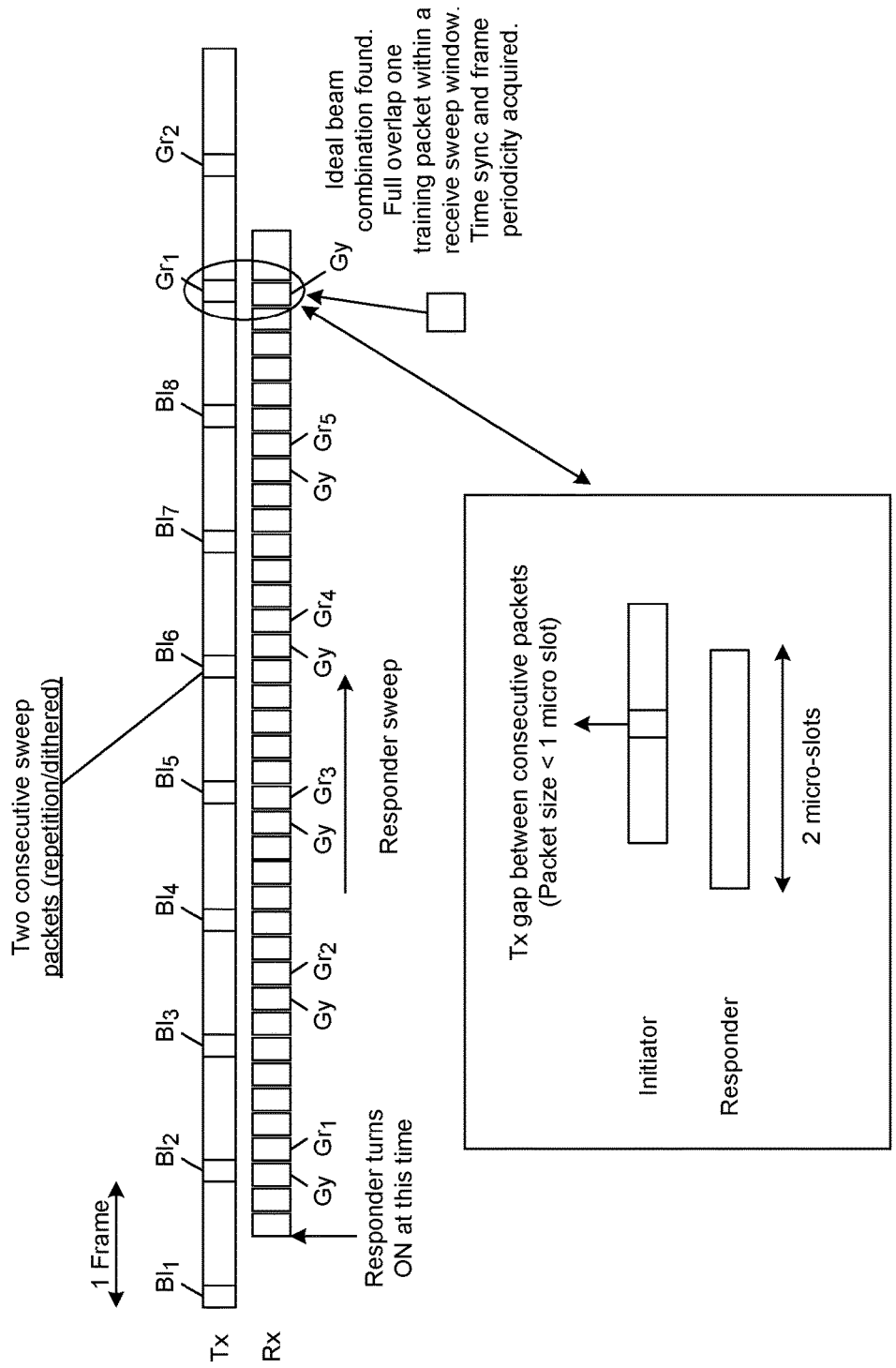
FIG. 2 illustrates how training packets are periodically transmitted from a transmitting node while a receiving node is attempting to asynchronously detect a training packet in each of a number of receive beamforming directions in accordance with some disclosed embodiments.

FIG. 2 shows one embodiment of a training sequence used in a wireless communication network in accordance with one embodiment of the disclosed technology. For purposes of illustration, it is assumed that each node in the network is capable of beamforming in seven possible transmit/receive directions. However, it will be appreciated that this is for illustration purposes only and that the actual network will typically employ greater numbers of beamforming directions.

When a node joins the network, it first begins listening in each of its possible receive beamforming directions for a training packet that is sent by a transmitting node in the network. In the example shown in FIG. 2, a transmitting node periodically sends training packets in a particular beamforming direction. In the example shown, transmit and receive directions are shown as different shadings. The transmitter sends training packets in a "blue" direction eight times ($BL_1$, $BL_2$, $BL_3$ ... $BL_8$), followed by the transmission of training packets in a "green" direction for eight times ($Gr_1$, $Gr_2$ ... ), and so forth until it has sent training packets in each of its transmit directions.

The unsynchronized receiving node joining the network begins to try and detect a training packet during a receive window that differs in size from the transmit window in which the training packets are transmitted. Therefore, the rate at which the receiver cycles through its possible receive directions differs from the rate at which the transmitter sends its training packets in a single direction. Because the transmitter and the receiver are not in sync, the receive beamforming direction used by the receiving node at the time of each transmission of the training packet will vary. In FIG. 2, it can be seen that a green receive direction $Gr_1$ is in use just after the second transmission in the blue direction $BL_2$. The next time the green receive direction is used ($Gr_2$), it is between transmissions in the TX blue direction.

This training packet sequence is repeated at periodic intervals, such as once every hour or some other regular time interval, so that a node joining the network does not have to wait too long before it will likely detect a training packet.

Figure 3A:
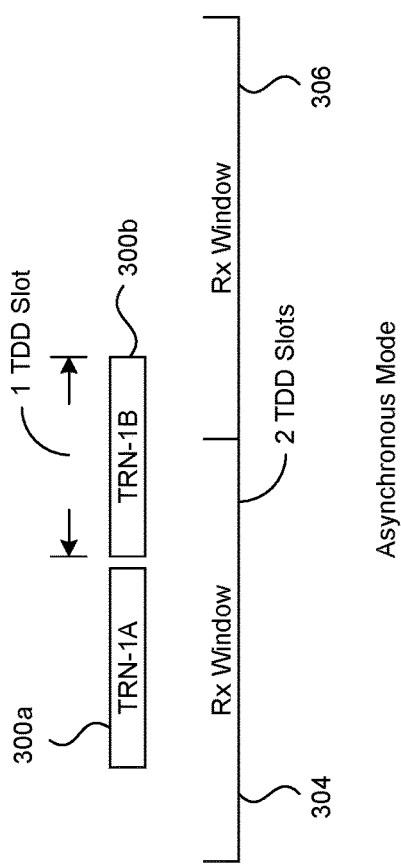
FIG. 3A illustrates a length of a training packet and a receive window for use in an asynchronous mode of communication between a transmitting node and a receiving node in accordance with some disclosed embodiments.

In one embodiment, the training packets are sent in a time period that is less than the window of time during which the receiver is listening in any particular direction. In the embodiment shown in FIG. 3A, a training packet 300a and a training packet 300b each have a duration that is less than one TDD time slot. The training packets are sent twice in succession. Receive windows 304, 306 each have a duration of 2 TDD time slots. This ensures that at least one of the two transmitted training packets will be captured during a receive window regardless of the relative timing of the receive and transmit TDD time slots.

Figure 3B:
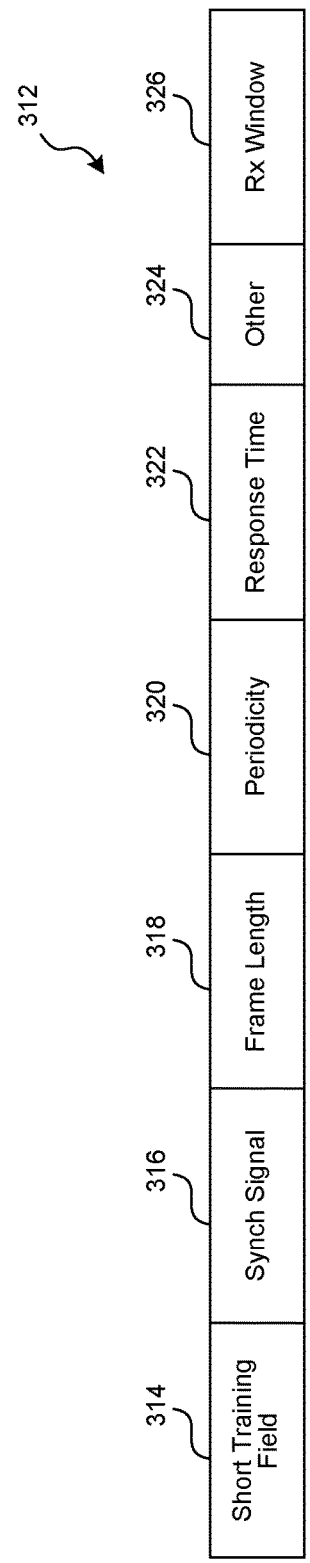
FIG. 3B illustrates a training packet transmitted in an asynchronous training mode in accordance with some disclosed embodiments.

As shown in FIG. 3B, a training packet 312 includes a known training field 314 (e.g. short training field) that allows a receiver to capture and decode the remainder of the training packet. In addition, the training packet includes a synchronization code 316 (which may be a separate code or included in the training field 314) that allows the receiver to synchronize itself with the transmitting node in the network. Each training packet may also include one or more other types of information such as a code 318 that indicates the frame length or structure of the training packet and a code 320 indicating the periodicity or how often the training packets will be re-transmitted. In some embodiments, the training packet 312 includes a code 322 that indicates when the receiving packet should respond if it detects a training packet. Other types of information 324 that can be included in the training packet include an indication of the particular Tx beam on which the training packet is sent, the index of a double packet, a Golay index (type of error correcting code), an indication of a codebook used by the transmitter and frequency information if the response frequency is different than the transmit frequency.

In one embodiment, a portion 326 of a transmitted training packet 312 is reserved for the transmitter to listen for a response. Once a training packet has been detected on a particular combination of transmit and receive beamforming directions, the receiving node joining the network analyzes the packet to recover the synchronization information and synchronize itself to the network. In addition, in some embodiments, the receiving node analyzes the training packet as it is being received to determine the packet structure and periodicity of the training packets. With this information, the receiver synchronizes itself to the transmitting node and can send a signal acknowledging the receipt of the training packet back to the transmitter. Upon receipt of the acknowledge signal, the transmitting node can start transmitting in a synchronous mode, as will be explained below. Other embodiments are also possible, such as allowing time for a receiving node to transmit an acknowledgment after all the training packets have been sent in a particular direction.

In some embodiments, a synchronous communication process is then begun in which each of the N×M possible transmit and receive beamforming direction possibilities is tested to determine which ones are useful in establishing a communication link between the nodes. The transmitter and receiver may use the same codebook that defines the beamforming direction possibilities. In another embodiment, the codebooks used by the transmitter and the receiver may be different. In one embodiment, the codebooks used by the transmitter and receiver for the asynchronous detection of a training packet are different than those used during the synchronous detection of training packets. One codebook may be a subset of the other.

In one embodiment, a transmitter transmits training packets N times in each of its N transmit directions. Because signals are being sent between the transmitter and the receiver, the node that is transmitting the training packets can be called the "initiator," and the node that is attempting to receive the training packets can be called the "responder."

Figure 4:
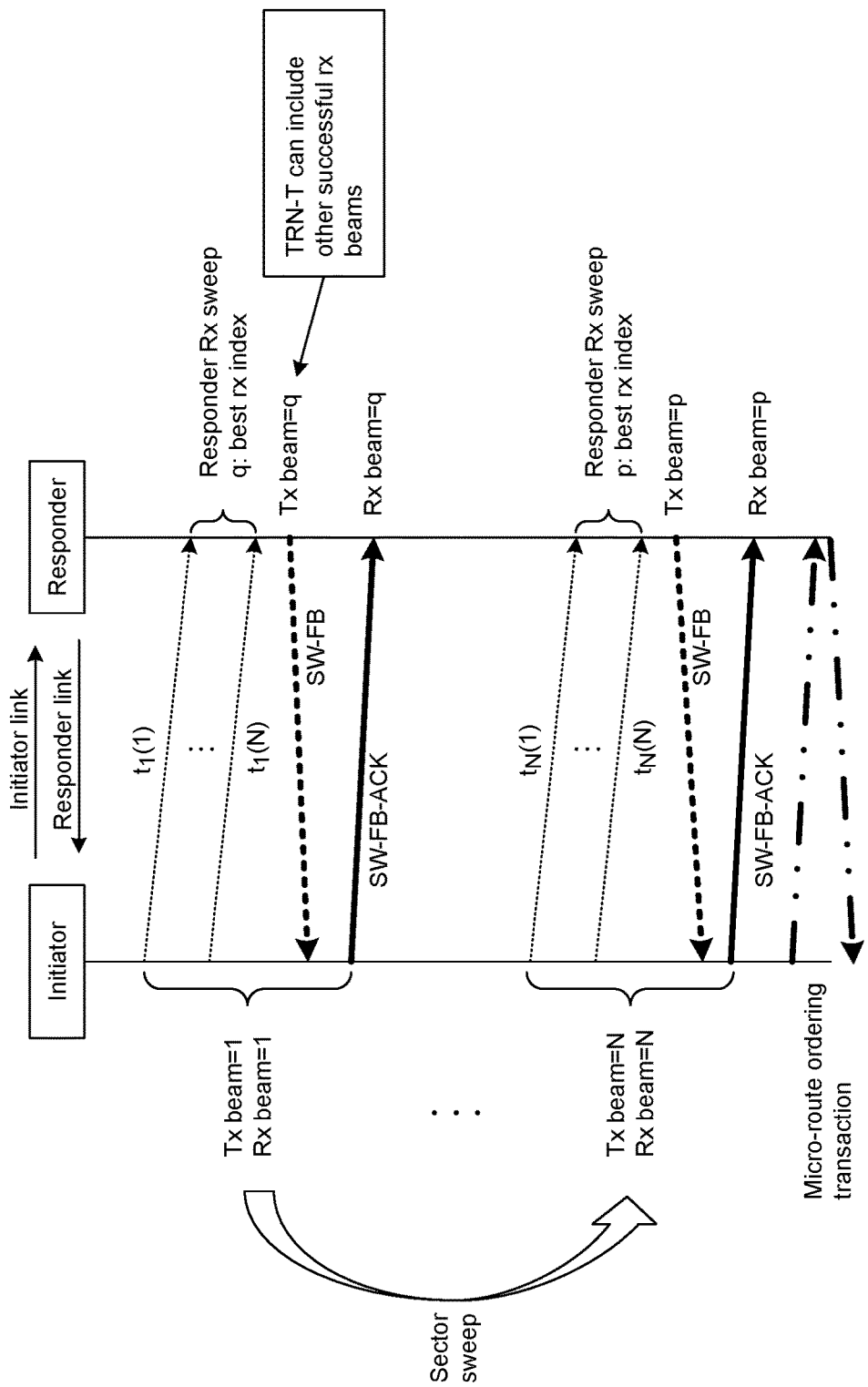
FIG. 4 shows a series of communications between a transmitting node (initiator) and a receiving node (responder) in order to synchronously test combinations of transmit and receive beamforming directions in accordance with some disclosed embodiments.

FIG. 4 illustrates one implementation of a method for determining the preferred beamforming directions in accordance with an embodiment of the disclosed technology. An initiator transmits training packets to a responder in direction $TX_1$ N times, followed by transmitting training packets in direction $TX_2$ N times and so forth until training packets have been transmitted N times in each of the N beamforming directions.

The responder, which is now synchronized to the initiator, listens for the training packets that are sent in beamforming direction $TX_1$ using each of its receive beamforming directions. For example, the responder first listens in receive direction $RX_1$ when the initiator transmits a training packet in direction $TX_1$. The responder then listens in direction $RX_2$ when the initiator transmits a second training packet in direction TX1, followed by listening in direction $RX_3$ and so forth until the initiator transmits N training packets in a particular direction. The number of beamforming directions at the initiator and at the responder may the same or may be different.

In the embodiment shown in FIG. 4, there is a period of time after the transmitter has finished transmitting the training packets in a particular direction for the responder to send feedback to the initiator. The feedback is sent in the receive beamforming direction that gave the best reception. The feedback tells the initiator which ones of the N possible receive beamforming directions can be used to detect the training packets. The feedback may also include some link measurements (signal strength, interference, etc.) that can be used to determine the quality of the link with a particular TX/RX beamforming direction pair. If the feedback signal is received, then the initiator sends back a feedback acknowledge signal that lets the responder know which of the TX/RX beamforming pairs will be used as possible micro-routes between the nodes and an order to try the pairs in case communication between the nodes is lost. If no feedback signal is received by the initiator, then the initiator assumes the responder cannot hear it in that particular TX beamforming direction and the next TX beamforming direction is tried.

Figure 5:
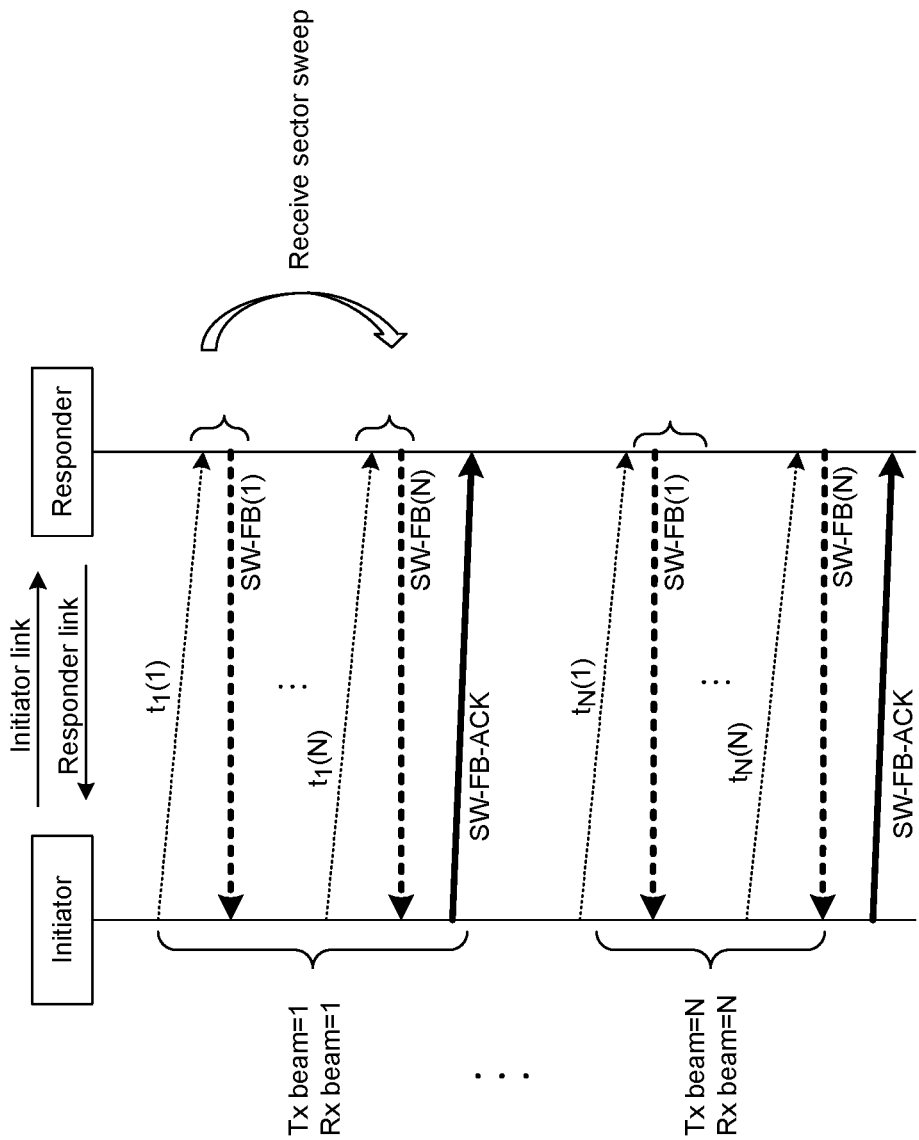
FIG. 5 shows a series of communications between a transmitting node (initiator) and a receiving node (responder) in order to synchronously test N×M combinations of transmit and receive beamforming directions in accordance with some alternate disclosed embodiments.

FIG. 5 shows a similar scheme except that a portion of time after each TX training packet is sent is reserved for the responder to transmit a feedback signal. For example, the initiator transmits in a first direction for a first time and the responder listens in its first receive direction. A portion of time is reserved after this transmission for the responder to transmit feedback if it has detected the training packet. After the initiator has completed sending the training packets in a particular direction and before a training packet is sent in the next transmit direction, time is reserved for the initiator to send a feedback acknowledge signal that informs the responder which, if any, of the TX/RX beamforming pairs will be used as a micro-route between them.

Figure 6:
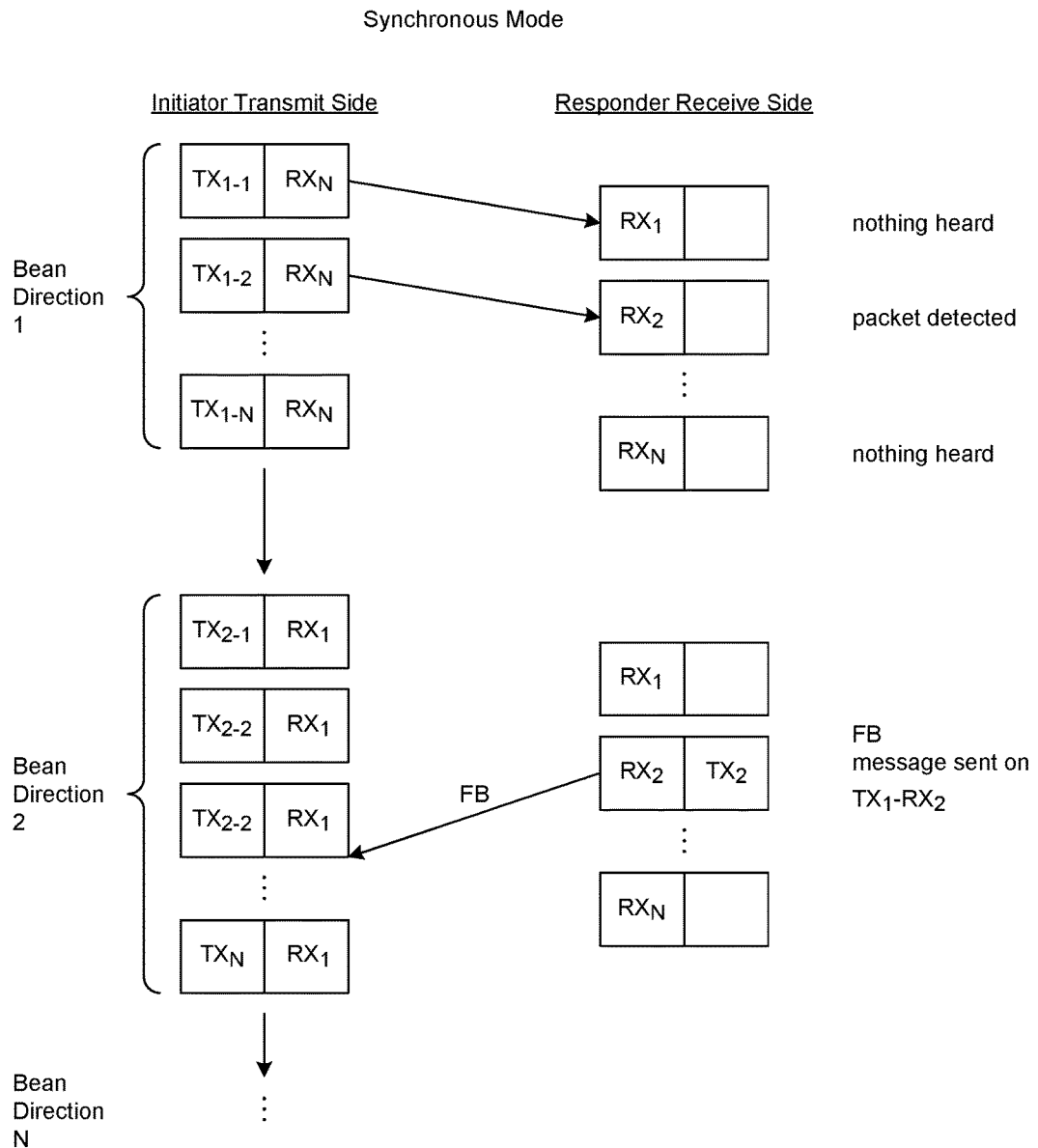
FIG. 6 shows a series of communications between a transmitting node (initiator) and a receiving node (responder) in order to synchronously test N×M combinations of transmit and receive beamforming directions in accordance with some alternate disclosed embodiments.

In the embodiment shown in FIG. 6, the transmit and receive windows for the initiator and responder are each divided into a transmit portion and a receive portion (that may or may not be of equal length). For example, an initiator transmits its training packet to a responder during the first portion of the window and then listens for a packet back from the responder during a second portion of the window. Conversely, the responder receives transmissions during the first portion of the window when the initiator is transmitting and transmits during the second portion of the window when the initiator is listening.

Because the transmit and receive beamforming directions are continually changing, any transmission containing feedback from the responder back to the initiator takes place on a transmit/receive beamforming direction pair on which a communication link was previously completed. Therefore, in the embodiment shown, the initiator listens in a direction of a previous transmit direction during the second portion of the transmit window. The example in FIG. 6 illustrates how this works.

For purposes of illustration, the designation RX1 on the initiator side means the initiator is listening in the same direction as the TX1 transmit direction. Similarly, on the responder side, the designation TX2 means the responder transmits in the same direction as the receive direction RX2, etc.

In the example shown, the initiator first transmits in direction TX1, and the responder listens in direction RX1 and does not hear the training packet. The initiator then transmits a second training packet in direction TX1, and the responder listens in direction RX2 and does detect the training packet with instructions as to when it should respond. Because the beamforming directions are always changing each time a training packet is transmitted and because a feedback signal is transmitted using a transmit/receive beamforming direction pair that can complete the communication link between the nodes, the initiator listens in a previous transmit direction during the second portion of the transmit window.

In the example shown, a communication path that connected the initiator to the responder is transmit direction TX1 and receive direction RX2. Therefore, during the second portion of the window when the responder is next listening in direction RX2, it transmits its acknowledge signal back to the transmitter in that same direction. By this time, the initiator is transmitting in direction TX2 but is listening in the direction of the previous transmission, e.g., RX1. Therefore, the feedback signal is transmitted using the beamforming pair TX1-RX2 (viewed from the initiator side) or TX2-RX1 (viewed from the responder side). The feedback signal received at the initiator informs the initiator that the training packet was detected when the initiator was transmitting in direction TX1 and the receiver was listening in direction RX2. This information is stored in both the initiator node and the responder node as a possible path on which the two nodes can communicate.

Processing proceeds in this manner until each of the N×M possibilities of transmit/receive beamforming directions have been tested. Each time the responder can detect a training packet, it sends feedback to the initiator to inform the initiator of another transmit/receive beamforming direction pair on which communication can take place.

In some embodiments, the initiator transmits an acknowledge signal back to the responder confirming the transmit/receive beam pairs that can be used as micro-routes. This can be done after transmission of the training packets has been completed in a particular direction or once all N×M training packets have been transmitted.

It should be noted that the responder does not have to synchronize the order of its receive beamforming directions with any particular order in which the initiator changes its transmit beamforming directions. The responder can test its receive directions in a modulo fashion (6, 7, 1, 2, 3, etc.) where the receive direction rolls back to the first direction after the last direction has been tested.

In one embodiment, the number of receive beamforming directions M is selected to be a prime number, e.g., 7, 17, 29, 31, 43, etc. Prime numbers of receive beamforming directions are preferred because there is a greatly reduced (theoretically zero) likelihood that duplicate pairs of transmit/receive beamforming directions will be tested between the initiator and the responder provided that the total time drift during the procedure is less than the size of one training packet. The number of transmit directions preferably equals the number of receive directions, but this is not required. For example, a transmitter may have eight transmit beamforming directions while a receiving node has seven receive beamforming directions. The transmitting node or the control computer may select seven of the eight possible transmit directions to test against the receive beamforming directions based on propagation conditions or on other criteria.

Figure 7:
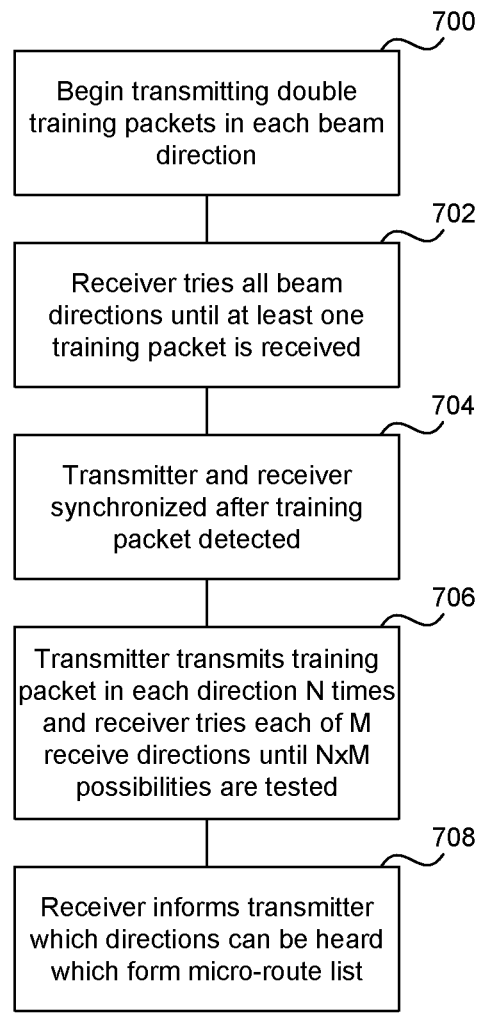
FIG. 7 is a flow diagram of steps performed by transmitting and receiving nodes in a wireless communication network in accordance with some disclosed embodiments.

FIG. 7 shows a sequence of steps performed by nodes in a wireless communication network in accordance with one embodiment of the disclosed technology. Although the steps are described in a particular order for ease of explanation, it will be appreciated that the steps could be performed in a different order or that different steps could be performed in order to achieve the functionality described.

Beginning at 700, a transmitter periodically begins transmitting double training packets in each beam direction. The period between transmissions is preferably different than the rate at which the receiver changes its beamforming receive directions.

At 702, the receiving node that has joined the network begins asynchronously listening for training packets in each of its beamforming directions in sequence until at least one training packet is detected. Once a training packet is detected, the receiver sends feedback to the transmitter and synchronizes itself to the transmitter using the synchronization information contained in the detected training packet at 704.

At 706, the transmitter (initiator) begins transmitting training packets N times in each of its N transmit directions while the receiver (responder) listens in each of its M receive directions until all desired (typically all N×M transmit/ receive beamforming direction but could be less) possibilities have been attempted.

At 708, the responder informs the initiator which transmit/receive beamforming combinations were successful in completing the communication link between the transmitter (initiator) and the receiver (responder). As indicated above, the initiator and the responder also may store a list of which TX/RX beamforming pairs should be tried and in which order in case communications between the nodes is lost. One or more of the transmit and receive beamforming directions that can complete the communication link are used as possible micro-routes between the nodes.

In one embodiment, successful transmit/receive beamforming pairs between nodes are also transmitted to the cloud controller computer 110 shown in FIG. 1. The cloud computer stores the pairs of directions in the database for use in developing route tables that are transmitted to the various nodes in the network.

Figure 8:
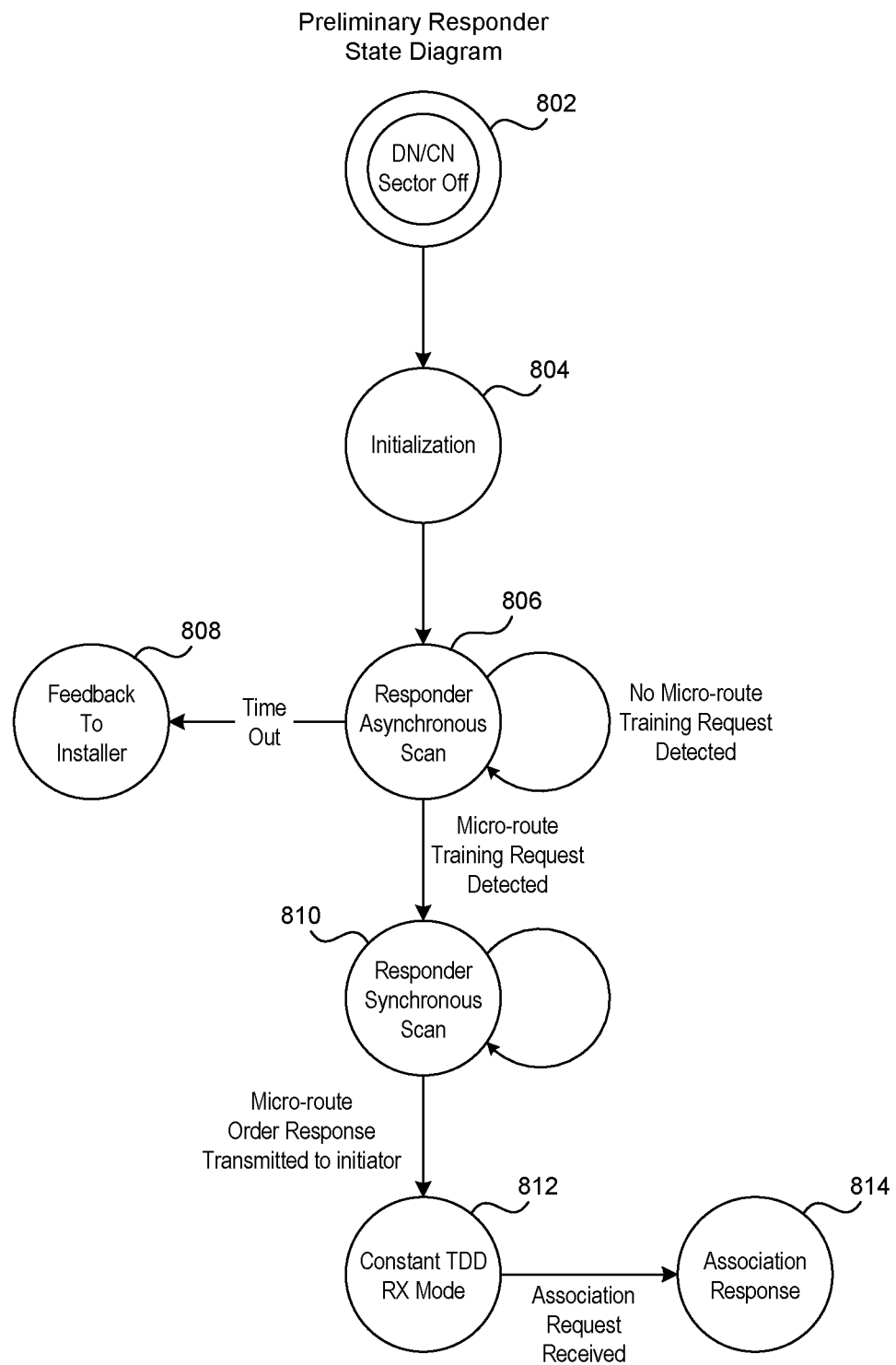
FIG. 8 is a state diagram of actions performed by an initiator node in accordance with a disclosed embodiment.

FIG. 8 is a state diagram showing the operations performed by a responder node in accordance with some disclosed embodiments. At state 802, a client node or destination node is not connected to the network. At state 804, the node attempts to join the wireless network by executing an initialization routine that runs upon installation, as part of a reboot protocol or upon detection that the node has lost its connection to the network. At state 806, the node (now called a responder node) begins the process of attempting to asynchronously detect a training packet from an initiator node. The responder tries to detect a training packet until either a packet is detected or a time out occurs. If a time out occurs, the responder proceeds to state 808 where it sends a feedback message to an installer or to the cloud controller computer 110 (e.g. via a cellular or other non-network communication path) that the node cannot join the network. Once the responder node has detected at least one training packet in the asynchronous mode, the responder begins listening for training packets in a synchronous mode at state 810. In some embodiments, the responder node remains in state 810 until each combination of transmit and receive beamforming directions has been tried. The responder node transmits to the initiator mode an indication of one or more receive beamforming directions or transmit/receive beamforming direction pairs that can be used to complete a communication link with the responder node. At state 812, the responder node operates in listening mode, such as a constant TDD receive listening mode, for packets in its designated time slot(s). If a request to communicate is received by the responder node, the responder node transmits an association response to the initiator node via the one of the transmit/receive beamforming direction pairs that were determined to complete a communication link between the nodes at state 814.

Figure 9:
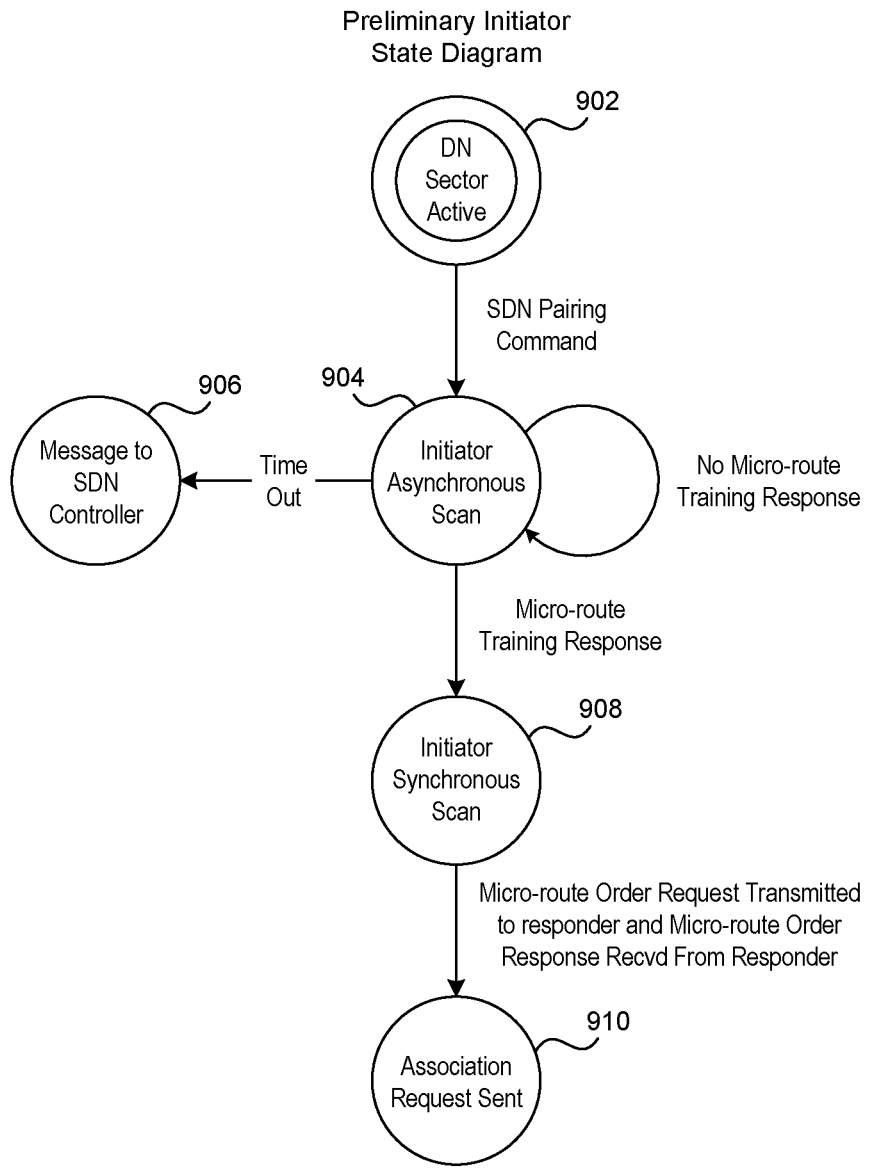
FIG. 9 is a state diagram of actions performed by a receiving node in accordance with a disclosed embodiment.

FIG. 9 shows a state diagram of the operation of an initiator node in some embodiments of a wireless communication network. At state 902, a destination node is operating in an active state in the network by sending and receiving packets to other nodes as requested. At state 904, the node begins an asynchronous scan mode in response to a received a pairing command that is generated from a software or hardware timer in the node itself or from a remote location such as the cloud controller computer 110. As discussed above, the node may be asked to pair with other nodes in the system on a periodic basis such as once per hour, once every ten minutes or at some other interval. In another embodiment, the cloud controller computer 110 instructs the initiator to begin the pairing processes after the cloud controller computer receives an indication that a node wants to join the network.

In the asynchronous scan mode, the initiator node transmits training packets in a number of transmit beamforming directions that can be detected by a responder node. The initiator node continues to transmit the training packets in the asynchronous mode until a signal is received from a responder node that it has detected a training packet or a time out occurs. If a time out occurs, the initiator node sends a message at state 906 to a cloud controller computer 110 indicating that no responder node has detected a training packet within the time period allowed.

If a training packet was detected by a responder node in the asynchronous mode, the initiator node begins a synchronous mode scan at state 908 by transmitting training packets in each of a number of transmit beamforming directions. In some embodiments, the initiator remains in state 908 until all transmit beamforming directions have be tested against all receive beamforming directions. The initiator node sends a list or ranking of the transmit/receive beamforming directions to be used in communications between the initiator node and the responder node. The list/ranking may be determined at the initiator node or may be received from the cloud controller computer 110. At state 910, when the initiator node has traffic or messages for the responder node, the initiator node sends an association request to the responder node to communicate using one or more of the transmit/receive beamforming pairs that were determined to complete a communication link between the nodes.

After the best transmit and receive beamforming pairs are determined for the nodes that communicate in the network, one or more of the TX/RX beamforming pairs are used to transmit data packets between the nodes.

Embodiments of the subject matter and the operations described in this specification can be implemented in digital electronic circuitry or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "processor" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages and declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA or an ASIC.

Processors suitable for the execution of a computer program include, by way of example, both general and special purpose microprocessors and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to (or both), one or more mass storage devices for storing data, e.g., magnetic, magneto-optical disks, or optical disks. Devices suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special-purpose logic circuitry.

From the foregoing, it will be appreciated that specific embodiments of the invention have been described herein for purposes of illustration but that various modifications may be made without deviating from the scope of the invention. Accordingly, the invention is not limited except as by the appended claims.

We claim:

1. A node for use in a wireless communication network, wherein the node comprises:
   a transceiver that transmits and receives packet data on a wireless communication frequency;
   a plurality of antennas with which radio frequency signals are transmitted and received at the node;
   a beamformer with which a transmit and receive direction can be changed by the node; and
   a processor that is configured to execute instructions to identify one or more transmit and receive beamforming direction pairs between the node and a responder node in a point-to-point wireless communication network, wherein each transmit and receive beamforming direction pair includes a transmit beamforming direction of the node and a receive beamforming direction of the responder node, and wherein the receive beamforming direction is set by delaying and summing receive signals to direct a listening direction of the responder node by:
   asynchronously transmitting training packets for a number of times in each of a number of transmit beamforming directions;
   receiving an indication that the responder node has asynchronously detected a training packet and is synchronized to the node; and
   once the node and the responder node are synchronized, synchronously transmitting training packets from the node for a number of times in each of a number of possible transmit beamforming directions;
   listening for feedback from the responder node that indicates that a training packet was received on a particular receive beamforming direction and listening direction of the responder node; and
   using a transmit and receive beamforming direction pair with which a training packet was received by the responder node to transmit data packets to the responder node.

2. The node of claim 1, wherein the node is configured to asynchronously transmit training packets before synchronously transmitting training packets from the node for a number of times in each of a number of possible transmit beamforming directions.

3. The node of claim 1, wherein the node is configured to asynchronously transmit a training packet twice in a time period that is less than a receive period of the responder node.

4. The node of claim 1, wherein the training packet includes synchronization information with which the responder node synchronizes to the network.

5. The node of claim 1, wherein the node has N transmit beamforming directions and the node is configured to transmit N training packets in each of the N transmit beamforming directions.

6. The node of claim 1, wherein the node is configured to send an indication of a transmit/receive beamforming direction pair to a network controller computer.

7. The node of claim 5, wherein the node is configured to receive a routing table from a network controller computer indicating a ranking of transmit/receive beamforming pairs to be used in communicating with the responder node.

8. The node of claim 7, wherein the node is configured to change transmit beamforming directions in accordance with the ranking when attempting to communicate with the responder node.

9. The node of claim 1, wherein the node is configured to transmit a training packet in one transmit beamforming direction and listen in a different receive beamforming direction for a signal from the responder node indicating that the responder node has detected the training packet.

10. The node of claim 1, wherein the number of transmit beamforming directions is a prime number.

11. The node of claim 1, wherein the node is configured to include frame structure information in the asynchronously transmitted training packets.

12. The node of claim 1, wherein the node is configured to include frame periodicity information in the asynchronously transmitted training packets.

13. A method, comprising:
  transmitting and receiving, by a transceiver of a node, packet data on a wireless communication frequency, wherein the packet data is transmitted and received at the node through a plurality of antennas, and wherein a beamformer of the transceiver of the node changes a transmit and receive direction;
  identifying one or more transmit and receive beamforming direction pairs between the node and a responder node in a point-to-point wireless communication network, wherein each transmit and receive beamforming direction pair includes a transmit beamforming direction of the node and a receive beamforming direction of the responder node, and wherein the receive beamforming direction is set by delaying and summing receive signals to direct a listening direction of the responder node, comprising;
  asynchronously transmitting training packets for a number of times in each of a number of transmit beamforming directions;
  receiving an indication that the responder node has asynchronously detected a training packet and is synchronized to the node; and
  once the node and the responder node are synchronized, synchronously transmitting training packets from the node for a number of times in each of a number of possible transmit beamforming directions;
  listening for feedback from the responder node that indicates that a training packet was received on a particular receive beamforming direction and listening direction of the responder node; and
  using a transmit and receive beamforming direction pair with which a training packet was received by the responder node to transmit data packets to the responder node.

14. The method of claim 13, further comprising asynchronously transmitting training packets before synchronously transmitting training packets from the node for a number of times in each of a number of possible transmit beamforming directions.

15. The method of claim 13, further comprising asynchronously transmitting a training packet twice in a time period that is less than a receive period of the responder node.

16. The method of claim 13, further comprising sending, by the node, an indication of a transmit/receive beamforming direction pair to a network controller computer.

17. The method of claim 16, further comprising receiving, by the node, a routing table from a network controller computer indicating a ranking of transmit/receive beamforming pairs to be used in communicating with the responder node.

18. The method of claim 17, further comprising changing transmit beamforming directions, by the receiving node, in accordance with the ranking when attempting to communicate with the responder node.

19. The method of claim 17, further comprising transmitting, by the node, a training packet in one transmit beamforming direction and listen in a different receive beamforming direction for a signal from the responder node indicating that the responder node has detected the training packet.

20. A wireless network with an initiator node and a responder node, wherein the initiator node comprises:
  a transceiver that transmits and receives packet data on a wireless communication frequency;
  a plurality of antennas with which radio frequency signals are transmitted and received at the initiator node;
  a beamformer with which a transmit direction and a receive direction can be changed by the initiator node; and
  a processor that is configured to execute instructions that cause the initiator node to identify one or more transmit and receive beamforming direction pairs between the initiator node and the responder node in the wireless communication network, wherein each transmit and receive beamforming direction pair includes a transmit beamforming direction of the node and a receive beamforming direction of the responder node, and the receive beamforming direction is set by delaying and summing receive signals to direct a listening direction of the responder node, by:
    asynchronously transmitting training packets for a number of times in each of a number of transmit beamforming directions;
    receiving an indication that a responder node has asynchronously detected a training packet and is synchronized to the node; and
    once the initiator node and the responder node are synchronized,
    synchronously transmitting training packets from the initiator node for a number of times in each of a number of possible transmit beamforming directions;
    listening for feedback from the responder node that indicates that a training packet was received on a particular receive beamforming direction and listening direction of the responder node; and
    using a transmit and receive beamforming direction pair with which a training packet was received by the responder node to transmit data packets to the responder node.

* * * * *